United States Patent [19]

Jancke et al.

[11] Patent Number: 5,764,913
[45] Date of Patent: Jun. 9, 1998

[54] COMPUTER NETWORK STATUS MONITORING SYSTEM

[75] Inventors: Gavin Jancke, Issaquah; Casey Lang Kiernan, Redmond, both of Wash.

[73] Assignee: Microsoft Corporation, Redmond, Wash.

[21] Appl. No.: 628,870

[22] Filed: Apr. 5, 1996

[51] Int. Cl.⁶ .................................... H04B 17/00

[52] U.S. Cl. ............ 395/200.54; 345/348; 345/334; 345/339

[58] Field of Search ............ 364/550; 395/200.11, 395/866, 348, 334, 339, 200.54; 345/348, 334, 339

[56] References Cited

U.S. PATENT DOCUMENTS 5,559,955  9/1996  Deu et al. ................. 395/182.08

*Primary Examiner*—James P. Trammell
*Assistant Examiner*—Thomas Peeso
*Attorney, Agent, or Firm*—Duft, Graziano & Forest, P.C.

[57] ABSTRACT

A status monitoring system for a computer network including obtaining, concurrently displaying, and dynamically updating, the operational state of a plurality of nodes in a computer network. The operational state for each node is displayed concurrently in an expandable hierarchical display having a dynamically updatable operational state icon corresponding to each node in the network. The operational state icon is characteristic of a traffic light and can be used in combination with superimposed status indicators.

13 Claims, 4 Drawing Sheets

COMPUTER NETWORK STATUS MONITORING SYSTEM

FIELD OF THE INVENTION

This invention relates to the field of computer network status monitoring, and in particular to a system for obtaining, concurrently displaying, and dynamically updating, an operational state indicator for a plurality of nodes in a computer network.

PROBLEM

Computer network administrators and other human users of a computer network require knowledge about the operational state of a plurality of nodes in a computer network for various reasons that include, but are not limited to, the need to maintain the operational status of the computer network, and the need to access a particular resource that is provided by and/or otherwise supported by the computer network. A computer network comprises a plurality of nodes interconnected by some communications link, wherein a node can be an individual computer or an entire network itself.

One problem with existing computer networks is that the real time operational status of a computer network is typically only available on a node by node request basis. That is, the status of each node in the network must be requested from each respective node seriatim. However, serially requesting the operational state of more than one node is a lengthy process particularly if a node is remote, slow to respond, or otherwise fails to respond. Therefore, the operational state of the first node could change by the time the last node is examined.

Another problem with existing computer networks is that the operational state for a given node in the computer network is typically binary. That is, the operational state is limited to whether or not a given node is communicatively connected to the network in a manner that facilitates a two-way request/acknowledgment communication.

Therefore, there exists a need for a concurrent and robust operational state indicator for each of a plurality of nodes in a computer network, in response to a single user input command from any one node in the network. A solution to this problem has heretofore not been disclosed prior to the invention as disclosed and claimed herein.

SOLUTION

The above described problems are solved and an advance achieved in the field of computer network status monitoring systems by the computer network status monitoring system of the present invention. The computer network status monitoring system includes a method and apparatus for monitoring an operational state of a plurality of nodes in a computer network, concurrently generating a display of the operational state of each of the plurality of nodes, dynamically updating the display of the operational state for each of the plurality of nodes, and generating a hierarchical list of objects available from a user selected one of the plurality of nodes.

Monitoring the plurality of nodes in the network includes establishing a communication link from a status collecting object in one of the plurality of nodes to a status reporting object in each of the plurality of nodes, and at least periodically polling the status reporting object in each of the plurality of nodes.

Concurrently generating a display of the operational state of each node in the network includes hierarchically displaying an individual operational state icon corresponding to each of the plurality of nodes, wherein the individual operational state icon is indicative of a present operational state of one of the plurality of nodes.

DETAILED DESCRIPTION

Figure 1:
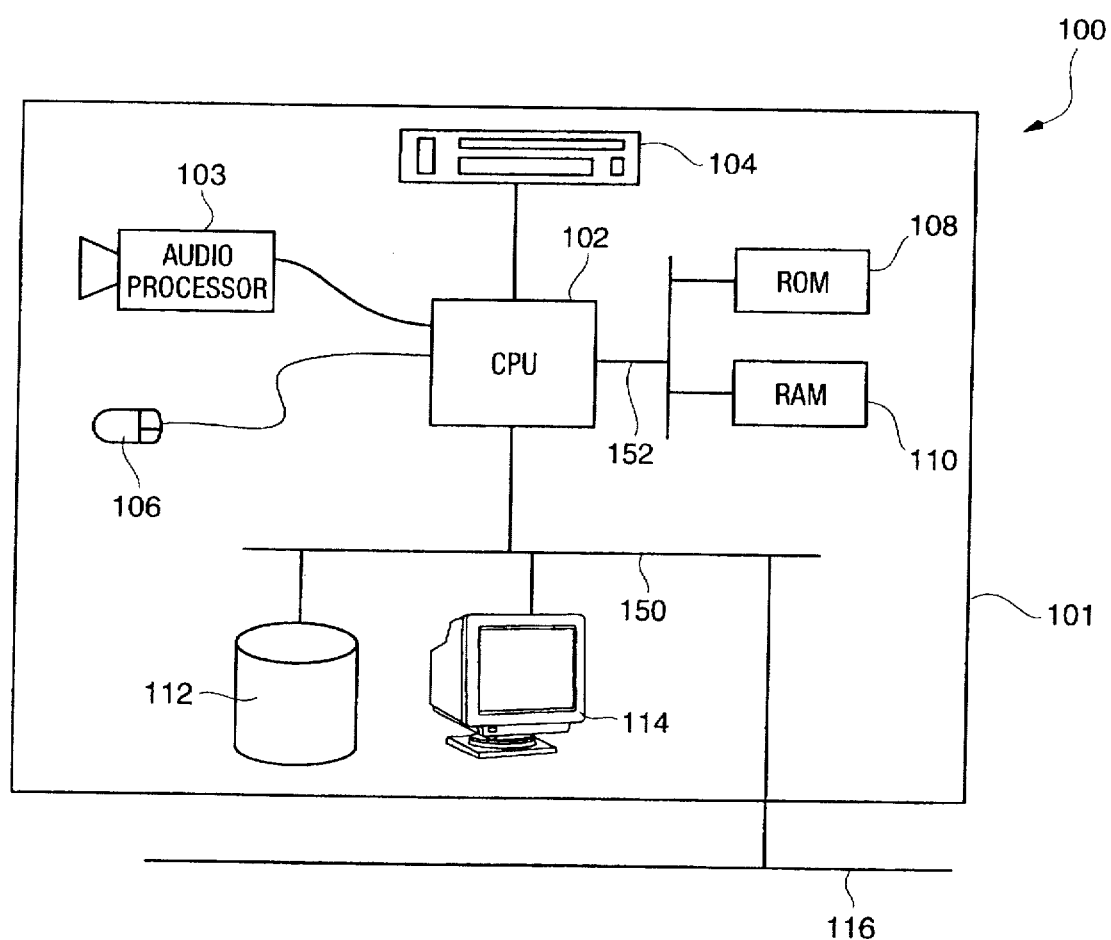
FIG. 1 illustrates a hardware environment in block diagram form for a node in a computer network.

Node Hardware Environment—FIG. 1

FIG. 1 illustrates an example hardware environment for a node 100 in a computer network. The present invention is operable on any of several standard computers readily available in the industry that can operate as a node in a computer network. Programmed instructions for the operational state Node Manager portion of the status monitoring system are executable on processor 102. Processor 102 stores and/or retrieves the programmed instructions and/or data from memory devices that include, but are not limited to, Random Access Memory (RAM) 110 and Read Only Memory (ROM) 108 by way of memory bus 152, and non-volatile memory device 112 by way of local bus 150. User input to computer system 100 is entered by way of keyboard 104 and/or pointing device 106. Human readable output from node 100 is viewed on display 114. Additional audio output is generated by audio processor 103. Other nodes in the computer network are accessible to node 100 by way of communication path 116 in a manner well known in distributed computing and computer network art.

Figure 2:
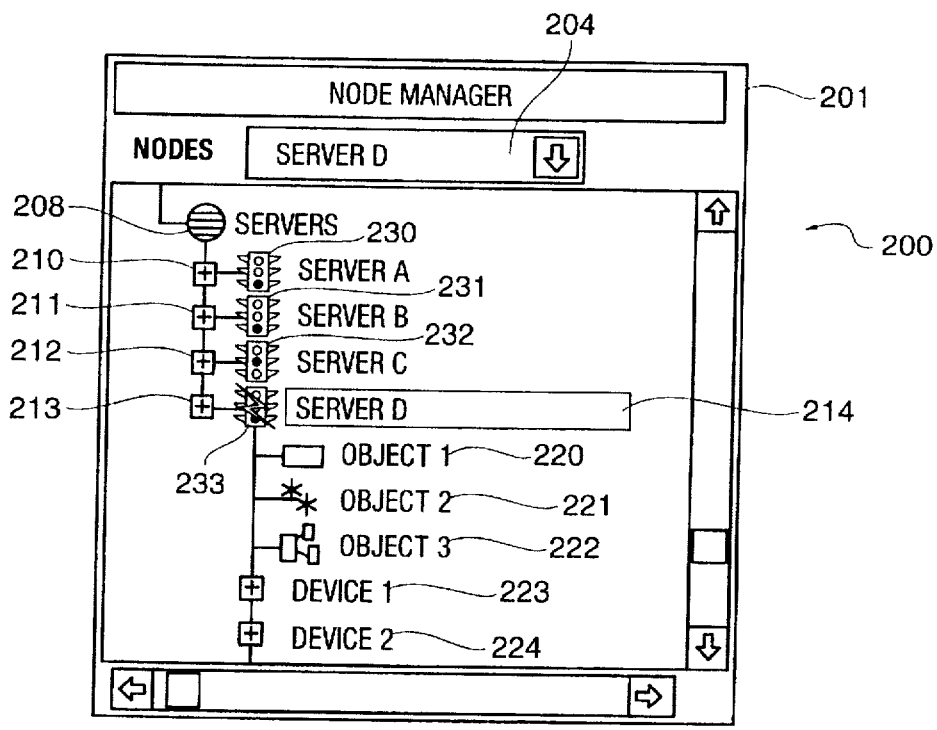
FIG. 2 illustrates an operational state display for a computer network.
Figure 3:
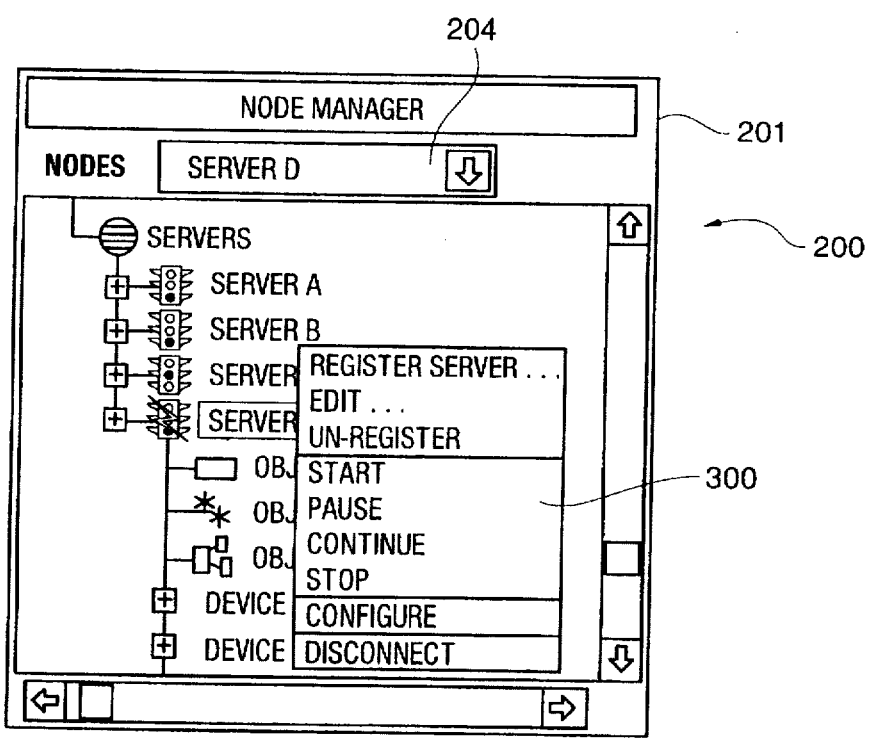
FIG. 3 illustrates an operational state display for a computer network with a node administration command window.
Figure 4:
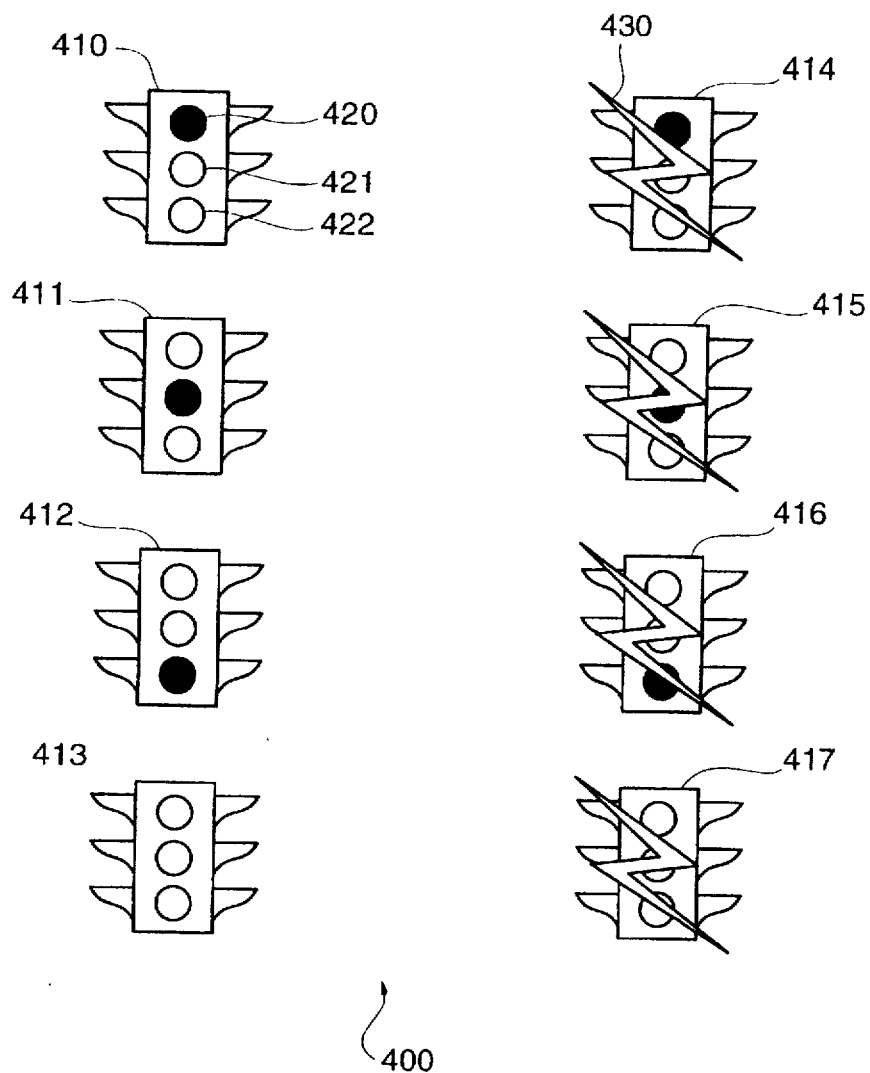
FIG. 4 illustrates a plurality of operational state indicia for an operational state icon.

Operational State Display—FIGS. 2-4

FIG. 2 illustrates an operational state display 200 for the status monitoring system of the present invention. A node manager window 201 is controlled by a Node Manager on each node in the computer network. The Node Manager collects operational state information by polling nodes in the network that are registered with that Node Manager. The Node Manager also displays an expandable hierarchical list of registered nodes 210-213 under a primary node list item 208 within the node manager window 201. Each registered node 210-213 is accompanied by an individual operational state icon 230-233. Further status definitions are discussed in the text accompanying FIG. 4 below. Key to the FIG. 2 illustration is that real-time operational state is being displayed concurrently for each of four nodes 210-213 by way of operational state icons 230-233. Further, each operational state icon 230-233 is dynamically updated in the real-time display should the state of any node change during the display.

A selected one of the plurality of registered nodes such as node 213 can be expanded to hierarchically display a list of objects 220-224 that are available by way of the selected node 213. A node 213 is selected by any user input command produced by any device including, but not limited to, a pointer device or a keyboard. The preferred embodiment responds to input from a pointer device, typically known as a multi-button mouse, wherein a first button of the mouse is pressed or "clicked" while pointing a position indicator controlled by the pointer device at any position along the line for node 213. The selected node 213 is noted as being selected by highlight box 214. An alternative way to select node 213 is by activating the drop down menu window from menu field 204 in a manner well known in the art.

FIG. 3 illustrates the operational state display 200 of FIG. 2 in addition to a node administration command window 300. All aspects of the node manager window 201 in FIG. 3 are as described in the text accompanying FIG. 2. The node administration command window 300 is a pop-up type window that is generated in response to selecting a node, such as node 213, using a second button of a multi-button mouse. The commands in the node administration command window 300 are used to control and/or administer the selected node as required by the user.

FIG. 4 illustrates a plurality of operational state indicia 400 for a plurality of operational state icons 410–417. Only one of the operational state indicia 400 at a time are displayed by a single node as illustrated in 230–233 of FIG. 2. Although eight states are used in the preferred embodiment, the present invention can accommodate any number of states that have meaning for a particular application. Using operational state icon 410 as an example, the icon illustrates three primary node states including operational, paused, and stopped. An icon having the characteristics of a stop light is used in the preferred embodiment to indicate that a node is operational by the green light position 422, paused by the yellow light position 421, and stopped by the red light position 420. Therefore, operational state icon 410 indicates an operational state of stopped 420. Operational state icon 411 indicates an operational state of paused 421. Operational state icon 412 indicates an operational state of operational or running 422. Operational state icon 413 has all status indicator lights blank which indicates an unknown operational state of a corresponding node.

Each of the operational states illustrated by operational state icons 410–413 can be used in combination with additional status symbols to indicate further operational node states as illustrated by indicator 430 in combination with each of the four states illustrated by operational state icons 414–417. In the preferred embodiment, indicator 430 is characteristic of a lightening bolt to indicate that the associated node is in use or "logically connected" by the client application that is the parent application to the Node Manager.

In the event a present operational state is not available from any one node in the network, the status monitoring system can either display an "unknown state" operational state alone or in combination with an indication of the time the state of the node has been unknown. Alternatively, a last known operational state can be generated along with an indication of the time since a polling request has failed to indicate a valid operational state. In addition, a sensory stimulus such as an audio tone or wave file can be generated to notify a human user of the operational state of a selected one of the nodes in the network.

Figure 5:
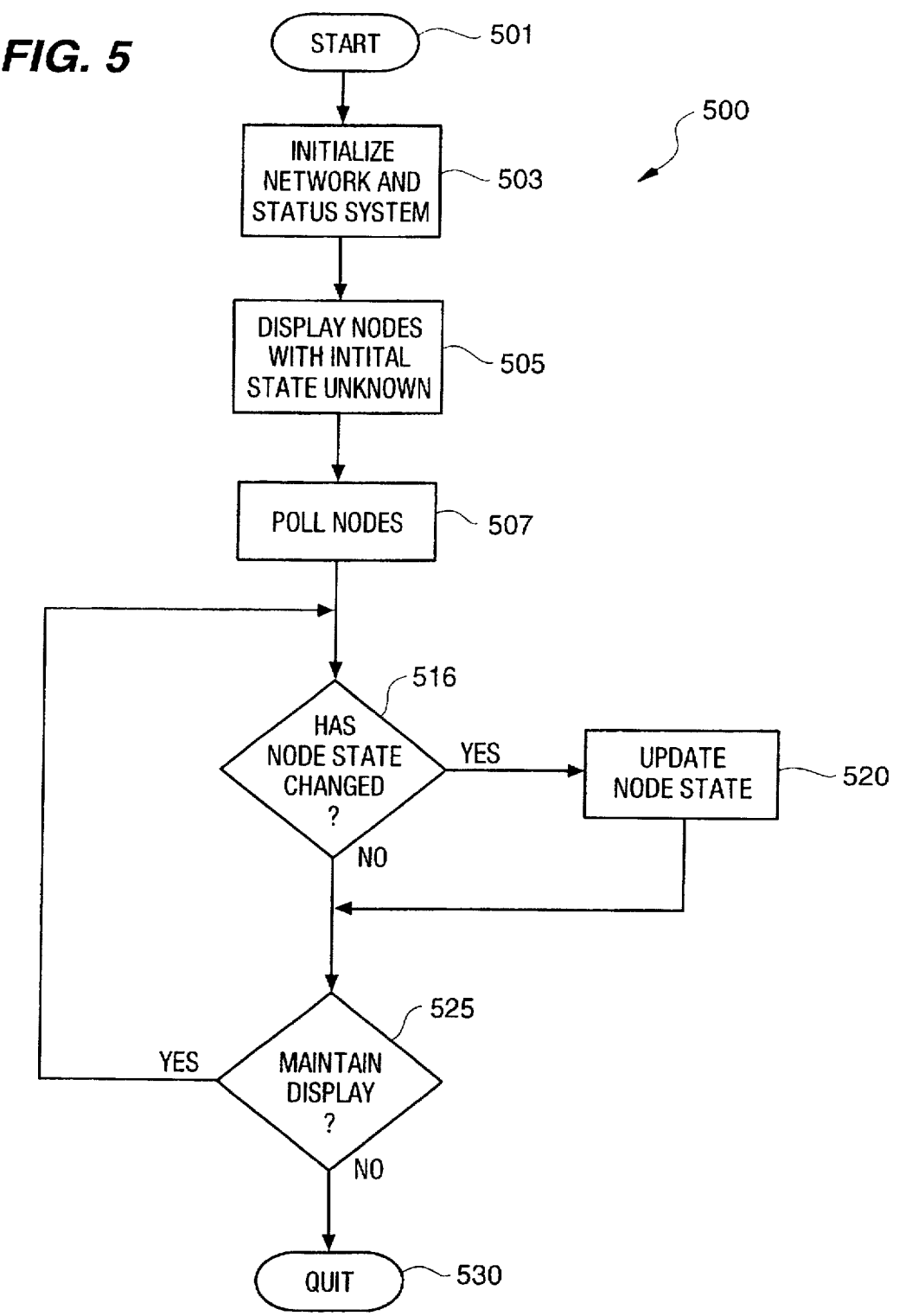
FIG. 5 illustrates operational steps in flow diagram form for the computer network status monitoring system.

Status Monitoring System Operational Steps-FIG. 5

FIG. 5 illustrates the status monitoring system operational steps 500 in flow diagram form. The status monitoring system operational steps 500 start at step 501 and proceed to network and system initialization at step 503. Network initialization includes, but is not limited to, establishing or reestablishing communication connectivity with any node in the network, and administering or performing maintenance on a node either remotely or locally. Initialization for the status monitoring system is performed individually and locally on each node and includes, but is not limited to, starting a Node Manager process for each client application displaying a node manager, establishing a polling thread to each other node manager for a registered node in the network, and loading the local network node registry so that the node manager on each node can monitor and display/update status for each locally registered node in the network.

At step 507, the status monitoring system begins to continuously or at least periodically polling for the operational state of each node in the network that is registered locally with the node manager. The operational state of each node is recorded in a memory copy of the operational display hierarchy for each local node manager. If the polling process of step 507 reveals that the state of a registered node has changed at decision step 516, then the state indicator for the changed node is updated at step 520 and processing continues at decision step 525. If the polling process has not revealed any change in node status for any registered node at decision step 516, then processing continues at decision step 525.

If the present operational state display is not terminated at decision step 525, then the display is maintained and processing continues at decision step 516 as previously described. Additional processing can occur at any time while the operational state display is maintained such as expanding the list of objects of any node, or selecting an administrative command from the administrative command window 300. If the present operational state display is terminated at decision step 525 then node manager window cleanup is completed and operational state display processing terminates at step 530.

Summary

The computer network status monitoring system of the present invention includes a method and apparatus for obtaining, concurrently displaying, and dynamically updating, the operational state of a plurality of nodes in a computer network. Although specific embodiments of this invention are disclosed herein, it is expected that persons skilled in the art can and will design alternative embodiments of this invention that fall within the scope of the following claims either literally or under the Doctrine of Equivalents.

We claim:

1. A status monitoring system for a computer network, said system comprising:

means for monitoring an operational state of each of a plurality of nodes in said computer network;

means for concurrently generating a display of a plurality of operational status icons each indicative of a lowest detail view of said operational state of a corresponding one of said plurality of nodes in said computer network, said means for concurrently generating being operational from any one of said plurality of nodes in said computer network;

means for superimposing at least one additional status indicator on said display of any one of said plurality of operational status icons such that compound operational status information for a single one of said plurality of nodes is available in a single viewable one of said plurality of operational status icons;

means for dynamically updating said display of said operational state for each of said plurality of nodes; and means for generating a hierarchical list of objects available from a user selected one of said plurality of nodes.

2. A system according to claim 1 wherein said means for monitoring includes:

means for establishing a communication link from a status collecting object in any one of said plurality of nodes to a status reporting object in each of said plurality of nodes; and means for polling said status reporting object in each of said plurality of nodes.

3. A system according to claim 1 wherein:

at least one of said plurality of operational state icons is characteristic of a traffic light; and said at least one of said plurality of operational state cons represents at least six operational states.

4. A system according to claim 1 including:

means, responsive to an absence of a present operational state, for generating a last known operational state.

5. A system according to claim 1 including:

means for generating a sensory stimulus to notify a human user of said operational state of a selected one of said plurality of nodes.

6. A method for monitoring and displaying status of a plurality of nodes in a computer network, said method comprising:

monitoring an operational state of each of said plurality of nodes in said computer network;

concurrently generating a display of a plurality of operational status icons each indicative of a lowest detail view of said operational state of a corresponding one of said plurality of nodes in said computer network, said step of concurrently generating being operational from any one of said plurality of nodes in said computer network;

superimposing at least one additional status indicator on said display of any one of said plurality of operational status icons such that compound operational status information for a single one of said plurality of nodes is available in a single viewable one of said plurality of operational status icons;

dynamically updating said display of said operational state for each of said plurality of nodes; and generating a hierarchical list of objects available from a user selected one of said plurality of nodes.

7. A method according to claim 6 wherein said step of monitoring includes:

establishing a communication link from a status collecting object in any one of said plurality of nodes to a status reporting object in each of said plurality of nodes; and polling said status reporting object in each of said plurality of nodes.

8. A method according to claim 6 including:

characterizing at least one of said plurality of operational state icons as a traffic light; and representing said at least one of said plurality of operational state icons in any one of at least six operational states.

9. A method according to claim 6 including:

generating a last known operational state in response to an absence of a present operational state.

10. A method according to claim 6 including:

generating a sensory stimulus to notify a human user of said operational state of a selected one of said plurality of nodes.

11. A device according to claim 6 including:

generating a sensory stimulus to notify a human user of said operational state of a selected one of said plurality of nodes.

12. A program storage device readable by a computer, tangibly embodying instructions executable by said computer to perform method steps for a status monitoring and display system for a computer network, said method comprising:

monitoring an operational state of each of a plurality of nodes in said computer network;

concurrently generating a display of a plurality of operational status icons each indicative of said operational state of a corresponding one of said plurality of nodes in said computer network, said step of concurrently generating being operational from any one of said plurality of nodes in said computer network and at least one of said plurality of operational status icons is characterized as a traffic light;

superimposing at least one additional status indicator on said display of any one of said plurality of operational status icons such that compound operational status information for a single one of said plurality of nodes is available in a single viewable one of said plurality of operational status icons, wherein said at least one of said plurality of operational status icons that is characterized as said traffic light is superimposed with a connectivity indicia that together can represent at least six operational states;

dynamically updating said display of said operational state for each of said plurality of nodes; and generating a hierarchical list of objects available from a user selected one of said plurality of nodes.

13. A device according to claim 12 wherein said step of monitoring includes:

establishing a communication link from a status collecting object in any one of said plurality of nodes to a status reporting object in each of said plurality of nodes; and polling said status reporting object in each of said plurality of nodes.

\* \* \* \* \*